(12) United States Patent
Hayashi et al.

(10) Patent No.: US 10,810,743 B2
(45) Date of Patent: Oct. 20, 2020

(54) IMAGE PROCESSING DEVICE, IMAGE PROCESSING METHOD, AND COMPUTER PROGRAM PRODUCT

(71) Applicant: PFU LIMITED, Ishikawa (JP)

(72) Inventors: Masayoshi Hayashi, Ishikawa (JP); Kiyoto Kosaka, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 91 days.

(21) Appl. No.: 16/192,319

(22) Filed: Nov. 15, 2018

(65) Prior Publication Data

US 2019/0087962 A1    Mar. 21, 2019

Related U.S. Application Data

(63) Continuation of application No. PCT/JP2016/066068, filed on May 31, 2016.

(51) Int. Cl.
*G06K 9/00* (2006.01)
*G06T 7/11* (2017.01)
(Continued)

(52) U.S. Cl.
CPC ............ *G06T 7/11* (2017.01); *G06K 9/00463* (2013.01); *G06T 1/0007* (2013.01); *G06T 7/12* (2017.01);
(Continued)

(58) Field of Classification Search
CPC . G06T 7/11; G06T 7/12; G06T 1/0007; G06T 11/60; H04N 1/3873; H04N 1/387;
(Continued)

(56) References Cited

U.S. PATENT DOCUMENTS 5,228,100 A  *  7/1993  Takeda .................. G06F 40/174
                                                382/175
6,226,402 B1 *  5/2001  Katsuyama ............ G06K 9/346
                                                382/171
(Continued)

FOREIGN PATENT DOCUMENTS

JP    2002-203206 A    7/2002
JP    2003-109007 A    4/2003
(Continued)

OTHER PUBLICATIONS

Decision to Grant a Patent issued in corresponding Japanese Patent Application No. 2018-520259, dated Jul. 23, 2019, with English translation.
(Continued)

*Primary Examiner* — Samir A Ahmed
(74) *Attorney, Agent, or Firm* — McDermott Will & Emery LLP

(57) ABSTRACT

An image processing device includes a memory configured to store layout data of a layout of a format, and a processor coupled to the memory, wherein the processor is configured to execute first acquiring a captured image that includes a format region, detecting edges that are included in the captured image, second acquiring edge straight lines based on the edges, calculating a correction amount of the format region with reference to the layout based on the edges, selecting, as a selected straight line, an edge straight line that is outermost among the edge straight lines that form a rectangle, third acquiring a reference straight line that forms an outline of the format region based on the correction amount and the selected straight line, and specifying a format coordinate of the format region based on the reference straight line.

17 Claims, 7 Drawing Sheets

(51) Int. Cl.
H04N 1/387 (2006.01)
G06T 7/12 (2017.01)
G06T 1/00 (2006.01)
G06T 11/60 (2006.01)
H04N 5/232 (2006.01)
G06K 9/36 (2006.01)

(52) U.S. Cl.
CPC ............. *G06T 11/60* (2013.01); *H04N 1/387* (2013.01); *H04N 1/3873* (2013.01); *H04N 5/23229* (2013.01); *G06K 2009/363* (2013.01)

(58) Field of Classification Search
CPC ........... H04N 5/23229; G06K 9/00463; G06K 2009/363
See application file for complete search history.

(56) References Cited

U.S. PATENT DOCUMENTS

| | | |
|---|---|---|
| 2002/0052892 A1 | 5/2002 | Kazumi |
| 2005/0078192 A1 | 4/2005 | Sakurai et al. |
| 2013/0043311 A1* | 2/2013 | Green .................... B42D 25/41 235/458 |
| 2013/0121595 A1 | 5/2013 | Kawatani et al. |
| 2014/0294303 A1* | 10/2014 | Kawatani .................. G06T 7/12 382/180 |
| 2015/0254884 A1* | 9/2015 | Tatsumi .................... G06T 3/40 345/660 |
| 2015/0256696 A1* | 9/2015 | Wada ................. H04N 1/00005 358/448 |
| 2017/0076169 A1* | 3/2017 | Campbell ............. G06K 9/344 |

FOREIGN PATENT DOCUMENTS

| | | |
|---|---|---|
| JP | 2005-122320 A | 5/2005 |
| JP | 2013-106160 A | 5/2013 |
| JP | 2014-26592 A | 2/2014 |

OTHER PUBLICATIONS

International Search Report and Written Opinion issued in International Patent Application No. PCT/JP2016/066068, dated Aug. 16, 2016; with English translation.

* cited by examiner

IMAGE PROCESSING DEVICE, IMAGE PROCESSING METHOD, AND COMPUTER PROGRAM PRODUCT

CROSS-REFERENCE TO RELATED APPLICATION

This application is a continuation of International Application No. PCT/JP2016/066068, filed on May 31, 2016, the entire contents of which are incorporated herein by reference.

FIELD

The present disclosure relates to an image processing device, an image processing method, and a computer program product.

BACKGROUND

A technique that acquires an image of an imaging object is disclosed conventionally.

Herein, a technique is disclosed that accurately detects an imaging object in a complicated background.

A technique is also disclosed that calculates a projection parameter from a focal length and an apex position of a lens and executes image transformation for an image of an imaging object by using the projection parameter.

A technique is also disclosed where a scanner that reads a background color as white creates form data while a position of an uppermost and leftmost end of a rectangle that includes all blocks is provided as an origin of a format, so that it is not possible to provide a leftmost end of the format as an origin but it is possible to define an origin of a format with an identical form uniquely even when the background color is white.

Examples of related-art are described in JP-A-2013-106160, in JP-A-2005-122320, and in JP-A-2002-203206.

However, a conventional image processing device has a problem in that it is not possible to detect an outline of an object in a background with an identical color unless hardware information such as a focal length or the like of a camera is provided.

SUMMARY

According to an aspect of an embodiment, an image processing device includes a memory configured to store layout data of a layout of a format, and a processor coupled to the memory, wherein the processor is configured to execute first acquiring a captured image that includes a format region, detecting edges that are included in the captured image, second acquiring edge straight lines based on the edges, calculating a correction amount of the format region with reference to the layout based on the edges, selecting, as a selected straight line, an edge straight line that is outermost among the edge straight lines that form a rectangle, third acquiring a reference straight line that forms an outline of the format region based on the correction amount and the selected straight line, and specifying a format coordinate of the format region based on the reference straight line.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the present disclosure will be explained with reference to accompanying drawings.

Configuration of Present Embodiment

Figure 1:
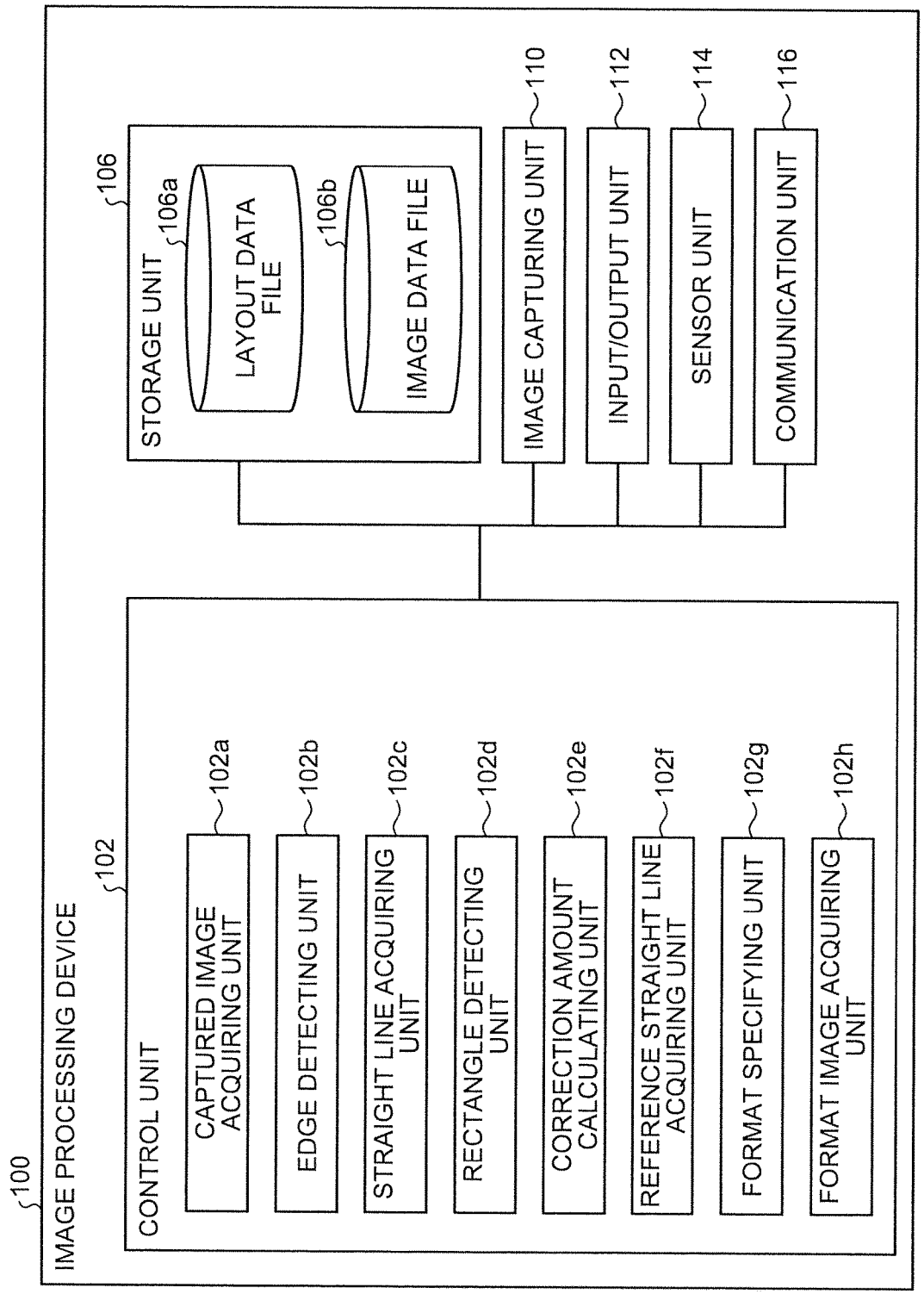
FIG. 1 is a block diagram illustrating an example of a configuration of an image processing device according to the present embodiment.

Hereinafter, an example of a configuration of an image processing device 100 according to an embodiment of the present disclosure will be explained with reference to FIG. 1, and subsequently, a process or the like according to the present embodiment will be explained in detail. FIG. 1 is a block diagram illustrating an example of a configuration of the image processing device 100 according to the present embodiment.

An embodiment as illustrated below is not intended to limit the present disclosure to the image processing device 100 but illustrates the image processing device 100 for embodying a technical idea of the present disclosure that is also capable of being equally applied to an image processing device 100 according to another embodiment that is included in what is claimed.

A mode of functional separation in the image processing device 100 that is illustrated in the present embodiment is not limited to the following and it is possible to execute its functional or physical separation or integration in an arbitrary unit to provide its configuration, as long as it is possible to provide a similar effect or function.

The image processing device 100 may be, for example, a mobile information processing device having portability (a mobile terminal) such as a tablet terminal, a mobile phone, a smartphone, a Personal Handyphone System (PHS), a personal digital assistant (PDA), a laptop personal computer, an eyeglass-type or watch-type wearable computer, or the like.

As illustrated in FIG. 1, the image processing device 100 is schematically configured to include a control unit 102, a storage unit 106, an image capturing unit 110, an input/output unit 112, a sensor unit 114, and a communication unit 116.

Although the image processing device 100 in FIG. 1 is depicted as a mobile terminal that includes the image capturing unit 110 in its housing, its configuration may be provided in such a manner that the image capturing unit 110 is not included in its housing and captured image data are received from an external image capturing device (for example, a desktop personal computer or the like).

Regardless of omission in FIG. 1, an input/output interface unit (not illustrated) that connects the input/output unit 112 and the control unit 102 may further be included in the present embodiment. Respective units of the image processing device 100 are communicably connected to one another via an arbitrary communication channel.

The communication unit 116 may be a network interface (a Network Interface Controller (NIC) or the like) for transmitting and receiving Internet Protocol data (IP data) by means of wired communication and/or wireless communication (Wireless Fidelity (Wi-Fi) or the like), Bluetooth (Registered Trademark), or an interface that executes wireless communication by means of infrared ray communication or the like.

The image processing device 100 may be communicably connected to an external device via a network by using the communication unit 116.

The sensor unit 114 detects a physical quantity and converts the detected physical quantity into a signal (a digital signal) for another medium. The sensor unit 114 may include a proximity sensor, a direction sensor, a magnetic field sensor, a linear acceleration sensor, a luminance sensor, a gyro sensor, a pressure sensor, a gravity sensor, an acceleration sensor, an atmospheric pressure sensor, a temperature sensor, and/or the like.

The input/output unit 112 executes input/output (I/O) of data. The input/output unit 112 may be, for example, a key input unit, a touch panel, a control pad (for example, a touch pad, a game pad, or the like), a mouse, a keyboard, a microphone, and/or the like.

The input/output unit 112 may be a display unit that displays a display screen of an application or the like (for example, a display, a monitor, a touch panel, or the like that is composed of a liquid crystal, organic electroluminescence (organic EL), or the like).

The input/output unit 112 may be a sound outputting unit (for example, a speaker or the like) that outputs sound information as a sound. The input/output unit (touch panel) 112 may include the sensor unit 114 that detects a physical contact and converts the detected physical contact into a signal (a digital signal).

The image capturing unit 110 captures a still image of an object (for example, a format or the like) to acquire image data of the still image. For example, the image capturing unit 110 may acquire captured image data.

The image capturing unit 110 may capture a continuous image (captures a video) of an object to acquire continuous (video) image data (frames). For example, the image capturing unit 110 may acquire video data. The image capturing unit 110 may acquire ancillary data.

A frame may be uncompressed image data. A frame may be high-resolution image data. High resolution may be full hi-vision, 4K-resolution, super hi-vision (8K-resolution), or the like.

The image capturing unit 110 may capture a video at 24 fps, 30 fps, or the like. The image capturing unit 110 may be a camera or the like that includes an image capturing element such as a Charge Coupled Device (CCD) and/or a Complementary Metal Oxide Semiconductor (CMOS).

The storage unit 106 is a storage means, and it is possible to use, for example, a memory such as a Random Access Memory (RAM) or a Read-Only Memory (ROM), a fixed disk device such as a hard disk, a Solid State Drive (SSD), an optical disc, and/or the like.

The storage unit 106 stores therein various databases, tables, buffers, and/or files (a layout data file 106a, an image data file 106b, and the like). The storage unit 106 may record therein a computer program or the like for providing an instruction to a Central Processing Unit (CPU) to execute various processes.

The layout data file 106a among respective components of the storage unit 106 stores layout data of a layout of a format. Layout data may be positional data or the like in regard to arrangement of a ruled line, a character, a photograph, a graphic, and/or the like in a format.

A format may be a specified format such as various licenses that include a driving license, various identification cards, or a health insurance certificate.

The image data file 106b stores image data (a frame or the like). The image data file 106b may store captured image data and/or format image data.

The control unit 102 may be composed of a tangible controller that includes a CPU, a Graphics Processing Unit (GPU), a Digital Signal Processor (DSP), a Large Scale Integration (LSI), an Application Specific Integrated Circuit (ASIC), a Field-Programming Gate Array (FPGA), or the like, or a control circuit that integrally controls the image processing device 100.

The control unit 102 includes an internal memory for storing a control program, a program for defining various processing steps or the like, and needed data, and executes information processing for executing various processes based on these programs.

The control unit 102 functional-conceptually includes a captured-image acquiring unit 102a, an edge detecting unit 102b, a straight line acquiring unit 102c, a rectangle detecting unit 102d, a correction amount calculating unit 102e, a reference straight line acquiring unit 102f, a format specifying unit 102g, and a format image acquiring unit 102h.

The captured-image acquiring unit 102a acquires captured image data of a captured image. The captured-image acquiring unit 102a may acquire captured image data of a captured image that includes a format region. A format region may be a region before projective transformation.

The captured-image acquiring unit 102a may acquire captured image data captured by the image capturing unit 110 or an external image capturing device. The captured-image acquiring unit 102a may control still image capturing that is executed by the image capturing unit 110 to acquire captured image data.

The captured-image acquiring unit 102a may control continuous image capturing or video capturing that is executed by the image capturing unit 110 to acquire captured image data (frame) that corresponds to one frame.

The edge detecting unit 102b detects an edge that is included in a captured image. The edge detecting unit 102b may detect an edge that is included in a captured image by using a Canny method.

For example, the edge detecting unit 102b may smooth a captured image with a Gaussian filter, calculate an edge intensity and gradient directions (quantization in four directions), execute a line thinning process, and execute edge extraction by a hysteresis threshold process so as to detect an edge.

The edge detecting unit 102b may executes pyramidal structuring of a captured image, execute edge extraction based on an adjacent gradation difference, execute noise removal (labelling, background removal, or the like), and execute edge correction (connection on a lacking part or the like) so as to detect an edge.

The straight line acquiring unit 102c acquires an edge straight line based on an edge. The straight line acquiring unit 102c may acquire, as parallel straight lines, edge straight lines parallel to a side of a read rectangle that is a rectangle that is formed from edge straight lines.

The straight line acquiring unit 102c may calculate a straight line candidate by means of Hough transformation on an edge and correct the straight line candidate based on a least-square method so as to acquire an edge straight line.

For example, the straight line acquiring unit 102c may calculate a straight line candidate by means of Hough transformation on an edge and correct the straight line candidate based on a least-square method so as to acquire information on an edge straight line (for example, a start point, an end point, and the number of votes in Hough transformation).

The rectangle detecting unit 102d detects a read rectangle that is a rectangle that is formed from edge straight lines.

For example, the rectangle detecting unit 102d may calculate a rectangle candidate that is formed from a group of acquired edge straight lines (in a horizontal direction and a vertical direction) and sort the rectangle candidate based on its size so as to detect a read rectangle.

The correction amount calculating unit 102e calculates a correction amount for a format region with reference to a layout of a format based on an edge. The correction amount calculating unit 102e may calculate a correction amount for a format region with reference to a layout of a format based on a ratio between edge lengths.

The reference straight line acquiring unit 102f selects, as a selected straight line, an outermost edge straight line among edge straight lines that form a rectangle, and acquires a reference straight line that forms an outline of a format region based on a correction amount and the selected straight line.

The reference straight line acquiring unit 102f may select, as selected straight lines, outermost parallel straight lines that satisfy a threshold that is based on layout data stored in the layout data file 106a and a read rectangle, and acquire, when an inner side straight line that is another edge straight line is present on an inner side of a selected straight line in a captured image and a distance between the selected straight line and the inner side straight line is based on a correction amount, a reference straight line that is present on an outer side of the selected straight line according to the correction amount.

The reference straight line acquiring unit 102f may select, as selected straight lines, outermost parallel straight lines that satisfy a threshold that is based on layout data stored in the layout data file 106a and a read rectangle, and acquire a reference straight line that is present on an outer side of the selected straight line according to a correction amount when an inner side straight line that is another edge straight line is absent on an inner side of the selected straight line in a captured image, when an inner side straight line is present but a distance between the selected straight line and the inner side straight line is not based on the correction amount, or when an opposite side inner side straight line that is another edge straight line is present on an inner side of a selected straight line that is an opposite side of the selected straight line in the captured image and a distance between the selected straight line that is the opposite side and the opposite side inner side straight line is based on the correction amount.

The format specifying unit 102g specifies format coordinates of a format region based on a reference straight line. The format specifying unit 102g may calculate coordinates of a point of intersection between reference straight lines, and thereby, specify format coordinates of a format region.

The format image acquiring unit 102h executes a crop process on a format region in a captured image based on format coordinates and thereby acquires format image data. The format image acquiring unit 102h may further store the acquired format image data in the image data file 106b.

Process of Present Embodiment

Figure 2:
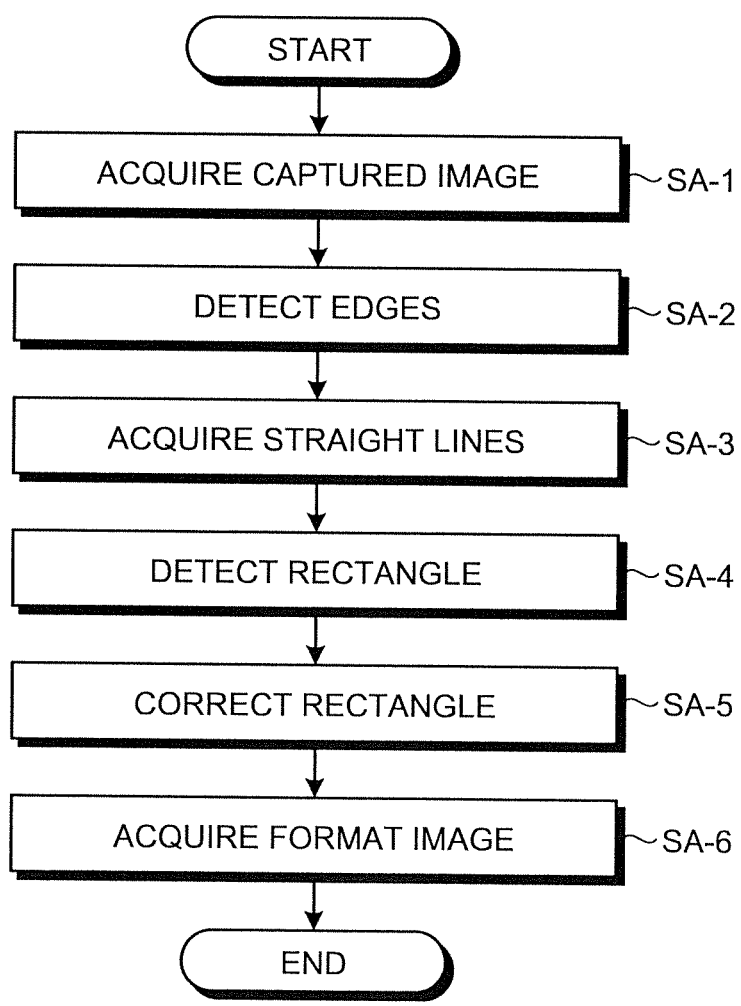
FIG. 2 is a flowchart illustrating an example of a process for an image processing device according to the present embodiment.

As an example of a process to be executed by the image processing device 100 (mobile terminal) with the above-mentioned configuration, an example of a crop process according to the present embodiment will be explained with reference to FIGS. 2 to 9. FIG. 2 is a flowchart illustrating an example of a process in the image processing device 100 according to the present embodiment.

As illustrated in FIG. 2, the captured-image acquiring unit 102a first acquires captured image data of a captured image that includes a format region before projective transformation that is captured by the image capturing unit 110 (Step SA-1).

Then, the edge detecting unit 102b detects edges that are included in the captured image (Step SA-2).

Then, the straight line acquiring unit 102c calculates straight line candidates by means of Hough transformation on edges detected by the edge detecting unit 102b and corrects the straight line candidates according to a least-square method so as to acquire edge straight lines (Step SA-3).

Then, the rectangle detecting unit 102d detects a read rectangle that is a rectangle that is formed from edge straight lines acquired by the straight line acquiring unit 102c (Step SA-4).

Then, the control unit 102 executes a rectangle correcting process (Step SA-5).

Rectangle Correcting Process

Figure 3:
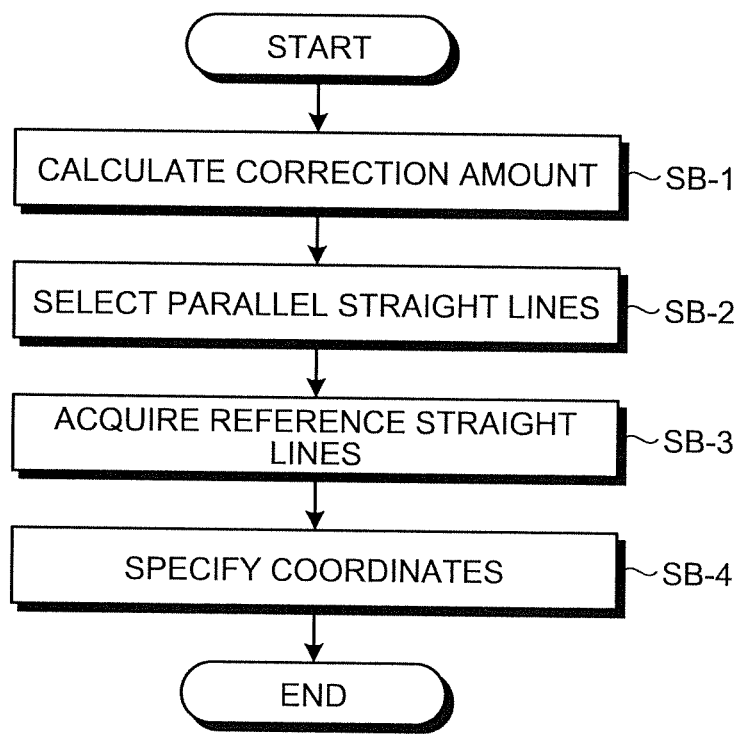
FIG. 3 is a flowchart illustrating an example of a process for an image processing device according to the present embodiment.

An example of a rectangle correcting process according to the present embodiment will be explained with reference to FIGS. 3 to 9. FIG. 3 is a flowchart illustrating an example of a process for the image processing device 100 according to the present embodiment.

As illustrated in FIG. 3, the correction amount calculating unit 102e first calculates a correction amount of a format region with reference to a layout of a format based on a ratio between lengths of edges detected by the edge detecting unit 102b and layout data stored in the layout data file 106a (Step SB-1).

Figure 4:
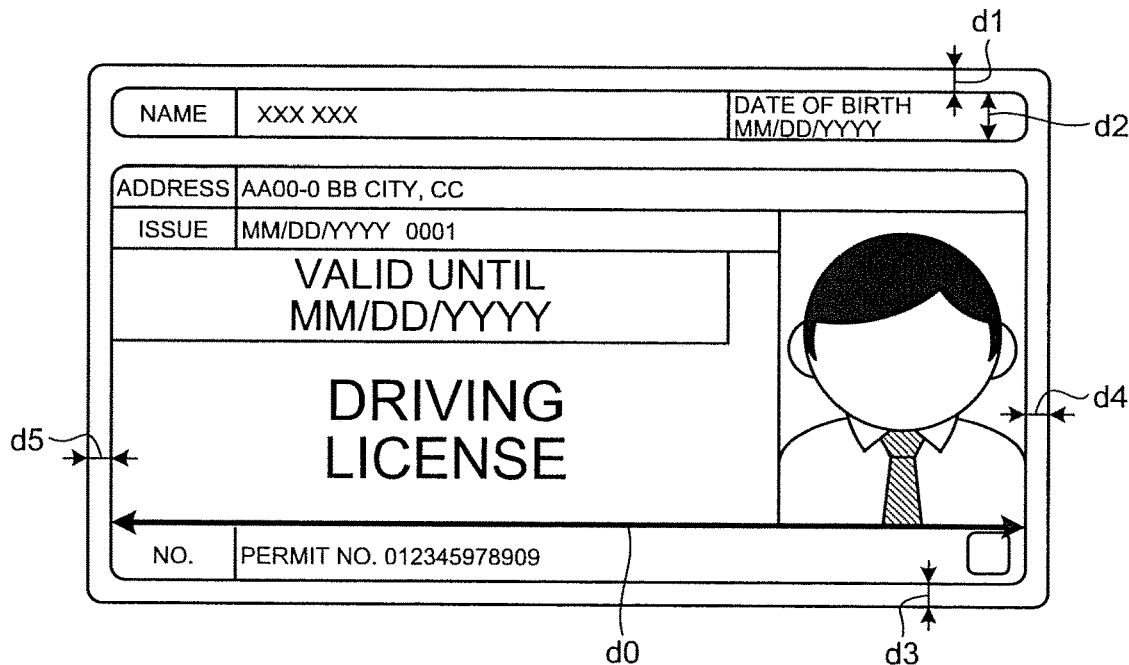
FIG. 4 is a diagram illustrating an example of layout data according to the present embodiment.
Figure 5:
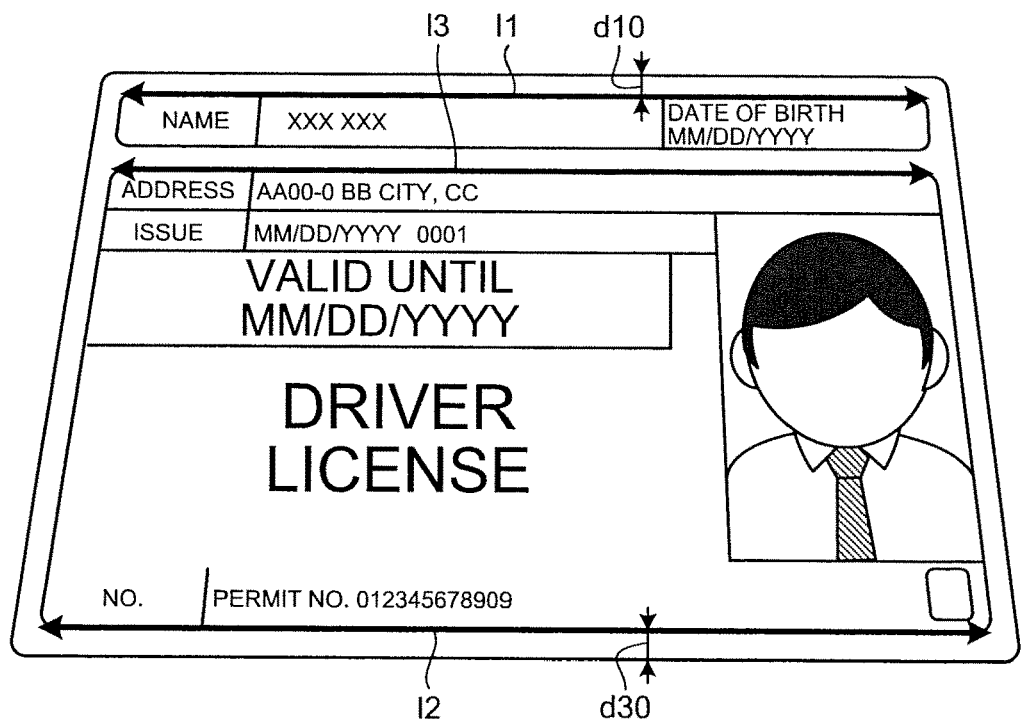
FIG. 5 is a diagram illustrating an example of a format region before projection transformation according to the present embodiment.
Figure 6:
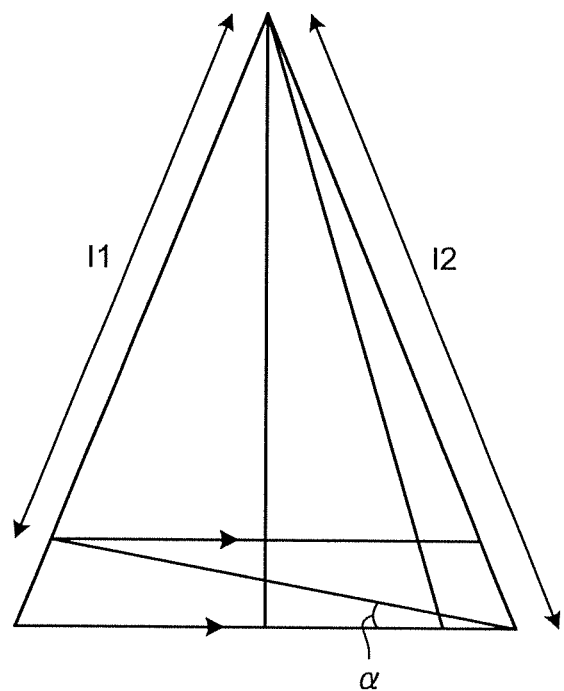
FIG. 6 is a diagram illustrating a relationship between edges according to the present embodiment.
Figure 7:
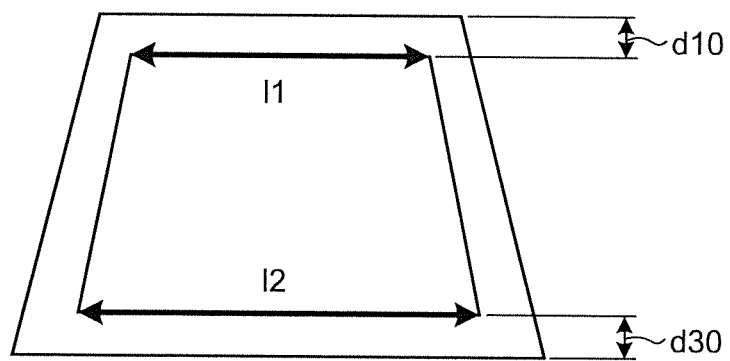
FIG. 7 is a diagram illustrating a relationship between edges according to the present embodiment.

An example of a correction amount calculating process according to the present embodiment will be explained with reference to FIG. 4 to FIG. 7. FIG. 4 is a diagram illustrating an example of layout data according to the present embodiment. FIG. 5 is a diagram illustrating an example of a format region before projective transformation according to the present embodiment. FIG. 6 and FIG. 7 are diagrams illustrating a relationship between edges according to the present embodiment.

As illustrated in FIG. 4, the layout data file 106a according to the present embodiment may store layout data of a driving license. Layout data of a driving license may include lengths of ruled lines, a distance between ruled lines, and the like.

For example, layout data of a driving license may include, for a distance between ruled lines (dn), data such as "d1=d3=d4=d5" and "d0:d1:d2=79.6:3:4".

As illustrated in FIG. 5 to FIG. 7, in the present embodiment, a correction amount with reference to layout data of a driving license stored in the layout data file 106a may be calculated by taking projective transformation into consideration.

In the present embodiment, as illustrated in FIG. 6 and FIG. 7, a correction amount may be calculated as a "ratio between a length (l1) of an edge that is an upper base of a trapezoide and a length (l2) of an edge that is a lower base"≈cos α by using a length (ln) of an edge of a format region before projective transformation as illustrated in FIG. 5 based on an angle α where the image capturing unit 110 is obliquely inclined thereby, while taking a reduction based on an optical path length and a reduction based on a projective plane into consideration.

Thereby, in the present embodiment, "d10≈(l1/l2)²·d30" may be obtained by means of approximation as illustrated in FIG. 5. In the present embodiment, l3≈l1 may be obtained by means of approximation as illustrated in FIG. 5.

Thus, in the present embodiment, a correction amount may be determined by capturing a feature of detected edges.

By returning to FIG. 3, the straight line acquiring unit 102c acquires (selects), as parallel straight lines, edge straight lines parallel to a side of the read rectangle detected by the rectangle detecting unit 102d (Step SB-2). Parallel straight lines may include an edge straight line with an angle with respect to a side of the read rectangle that is an angle within ±1 degree.

Figure 8:
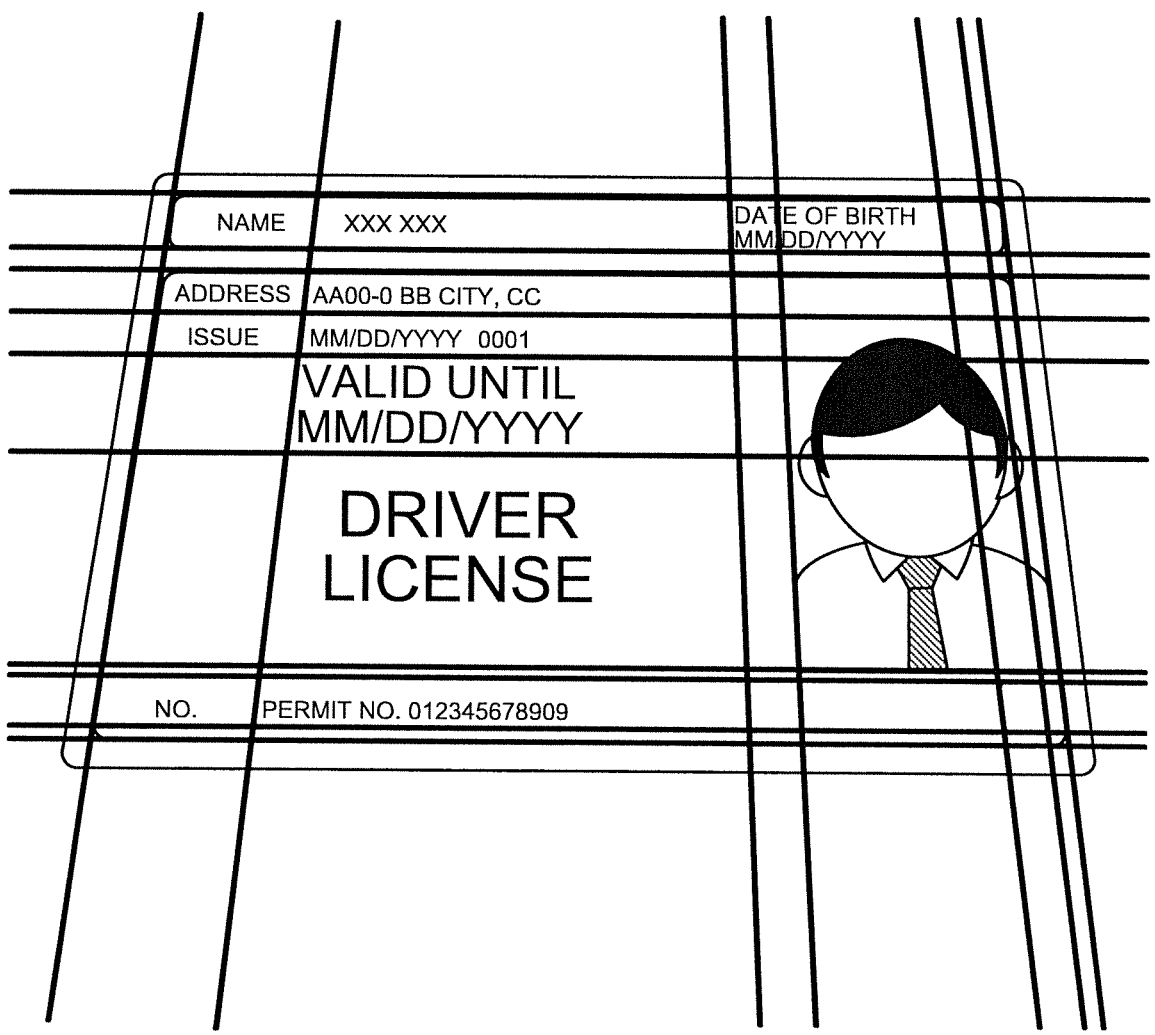
FIG. 8 is a diagram illustrating an example of parallel straight lines according to the present embodiment.

An example of a straight line selection process according to the present embodiment will be explained with reference to FIG. 8. FIG. 8 is an example illustrating an example of parallel straight lines according to the present embodiment.

As illustrated in FIG. 8, in the present embodiment, straight lines parallel to respective sides of a detected read rectangle may be selected from a group of detected edge straight lines. Thus, in the present embodiment, parallel straight lines may be selected from a group of detected edge straight lines based on a detected read rectangle.

By returning to FIG. 3, the reference straight line acquiring unit 102f selects, as selection straight lines, outermost parallel straight lines that satisfy a threshold that is based on layout data stored in the layout data file 106a and the read rectangle, and acquires reference straight lines that form an outline of a format region that are present on an outer side of the selected straight lines according to a correction amount (Step SB-3).

Figure 9:
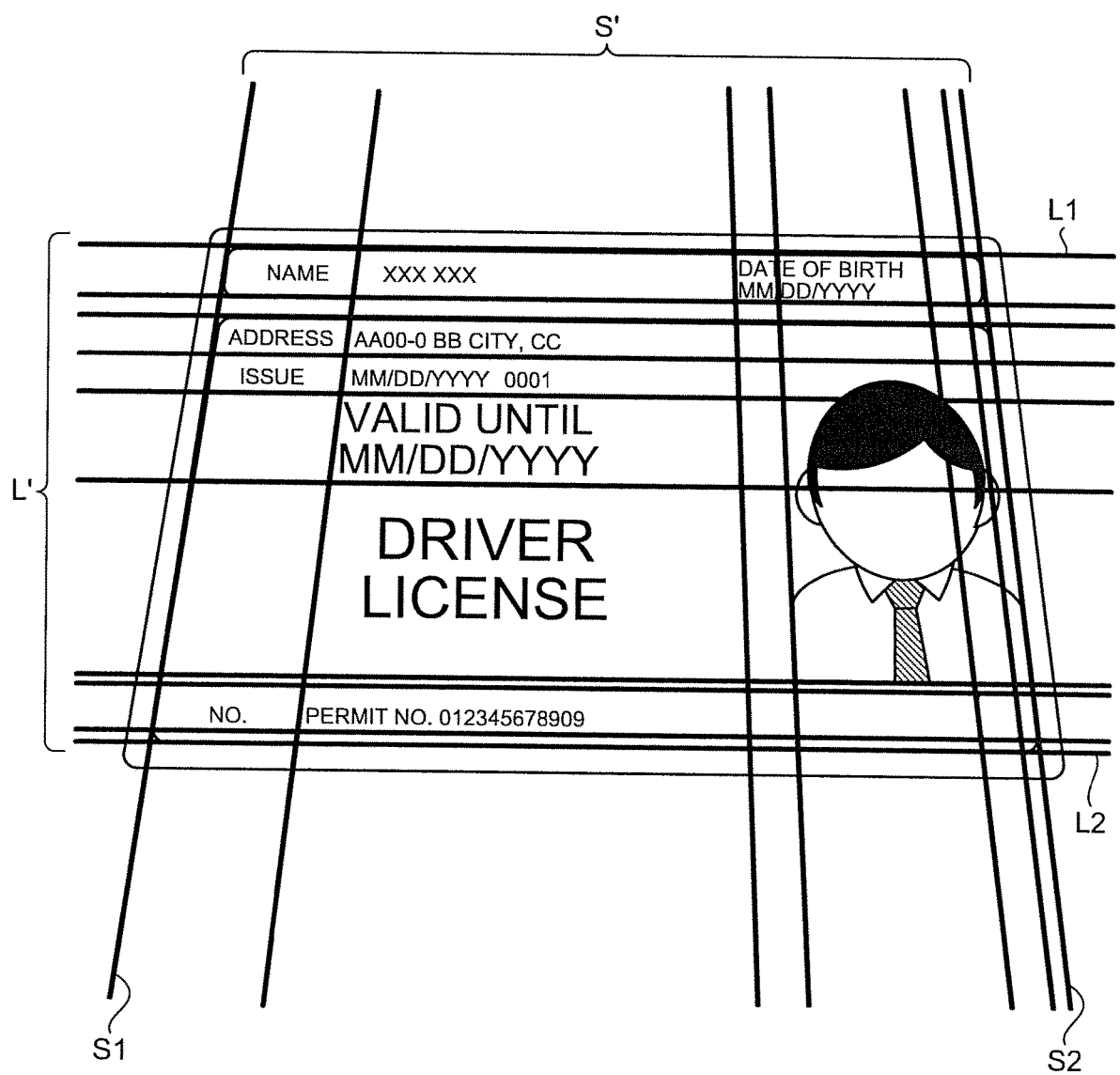
FIG. 9 is a diagram illustrating an example of selection candidate straight lines according to the present embodiment.

An example of a layout determination process according to the present embodiment will be explained with reference to FIG. 9. FIG. 9 is a diagram illustrating an example of selected candidate straight lines according to the present embodiment.

As illustrated in FIG. 9, in the present embodiment, four parallel straight lines that form a read rectangle are first acquired as initial values of selected straight lines (selected candidate straight lines L' (L'1 and L'2) that form long sides and selected candidate straight lines S' (S'1 and S'2) that form short sides).

In the present embodiment, when parallel straight lines are present on an outer side of a selected candidate straight line L'1 and a selected candidate straight line L'2 and within a threshold (for example, a quarter of a length of a short side of a format based on layout data or the like), their values are updated (parallel straight lines that are selected candidate straight lines L' are changed) so as to select a selected straight line L1 and a selected straight line L2.

In the present embodiment, whether an inner side straight line that is another edge straight line is present on an inner side of the selected straight line L1 and a distance between the selected straight line L1 and the inner side straight line is based on a correction amount (for example, a length equal to or more than ½ and equal to or less than 3/2 of an actual distance) is determined, so that a layout is determined from a relationship between the selected straight lines.

In the present embodiment, when the selected straight line L1 satisfies such determination, the processing is shifted to a latter process.

On the other hand, in the present embodiment, when the selected straight line L1 does not satisfy the determination, whether an opposite side inner side straight line that is another edge straight line is present on an inner side of the selected straight line L2 that is an opposite side and a distance between the selected straight line L2 and the opposite side inner side straight line is based on a correction amount is determined.

In the present embodiment, when the selected straight line L2 satisfies such determination, the determination for the selected straight line L1 is satisfied and the processing may be shifted to a latter process.

In the present embodiment, whether inner side straight lines that are other edge straight lines are present on an inner side of selected straight lines S (S1 and S2) and a distance between the selected straight lines S and the inner side straight lines is based on a correction amount is determined.

In the present embodiment, when the selected straight lines S satisfy such determination, a reference straight line is acquired that is present on an outer side of such selected straight lines L and the selected straight lines S according to a correction amount. Thus, in the present embodiment, a layout may be determined based on a correction amount.

By returning to FIG. 3, the format specifying unit 102g calculates coordinates of a point of intersection between reference straight lines acquired by the reference straight line acquiring unit 102f so as to specify format coordinates of a format region (Step SB-4), and terminates the processing.

That is, the format specifying unit 102g may calculate coordinates of four points based on reference straight lines that are a layout determination result.

By returning to FIG. 2, the format image acquiring unit 102h executes a crop process on a format region in a captured image based on format coordinates specified by the format specifying unit 102g so as to acquire format image data, stores the format image data in the image data file 106b (Step SA-6), and terminates the processing.

Thus, in the present embodiment, it is possible to clip an image data of an object accurately, even from a background with an identical color or a background with a similar color, in a smartphone or a mobile terminal with a camera such as a digital camera.

In the present embodiment, an image of an identification card that is borrowed from a client in counter services is captured on the spot, so that it is possible to provide a feeling of security to the client, and hence, it is useful for personal authentication in the counter services.

When an image of an identification card is captured, a table where the identification card is placed have a variety and may have a color identical to that of the identification card. A kind of a mobile terminal to be used also has a variety and a camera parameter may differ according to its model or remain confidential.

However, in the present embodiment, it is possible to detect an outline of a driving license accurately within approximately 10 degrees when a certification card is a driving license (1014 dots×634 dots @ 300 dpi), independently of any of a background and a camera parameter.

A technique that uses edge detection and a technique that uses a layout are conventionally provided as methods for detecting a position of an object.

However, it is not possible for a conventional technique that uses edge detection to find a boundary in a background with an identical color or a background with a similar color that is provided with a less gradation difference between an object and a background.

A technique that uses a layout needs information on a camera device such as a focal length and an image sensor size when oblique image capturing is taken into consideration.

In the present embodiment, edge detection, straight line detection, and rectangle detection are executed for an original document (for example, a driving license or the like) that is capable of executing layout determination based on ruled lines, so that a rectangle that is an outline of the original document is detected.

In the present embodiment, another edge on an inner side of an detected outline of an original document may be detected to recognize a boundary between a background and a medium correctly.

Thereby, in the present embodiment, a correction amount for determining a layout is calculated approximately, so that it is possible to obtain an outline of an original document without needing information on a camera device that is needed conventionally.

In the present embodiment, a layout is determined by using a correction amount and a group of selected straight lines, so that it is possible to specify a format region.

Other Embodiments

Although an embodiment of the present disclosure has been explained above, the present disclosure may be embodied in various different embodiments other than the above-mentioned embodiment within a scope of a technical concept as described in what is claimed.

For example, the image processing device 100 may execute a process in a stand-alone mode or may execute a process in response to a request from a client terminal (with a housing different from that of image processing device 100) so as to return a result of such a process to the client terminal.

Among respective processes explained in the embodiment, all or a part of processes that are explained as being automatically executed may be manually executed or all or a part of processes that are explained as being manually executed may also be automatically executed according to a publicly known method.

Processing steps, control steps, specific names, information that includes registered data on each process or parameters such as search conditions, screen examples, and database structures that are illustrated in the specification and the drawings may be arbitrarily changed unless otherwise specified.

Each illustrated component of the image processing device 100 is functionally conceptual and does not have to be physically configured as illustrated in the drawings.

For example, all or an arbitrary part of processing functions that are included in respective units of the image processing device 100, in particular, the processing functions that are executed by the control unit 102, may be realized by a CPU and a program that is interpreted and executed by the CPU, or may be realized as hardware according to a wired logic.

A program is recorded in a non-transitory computer-readable recording medium that includes programed instructions for causing a computer to execute a method according to the present disclosure, as described later, and are mechanically read by the image processing device 100 as needed. That is, the storage unit 106 or the like, such as a ROM and a HDD, stores a computer program for providing instructions to a CPU in cooperation with an Operating System (OS) to execute various processes. Such a computer program is loaded on the RAM to be executed and cooperates with the CPU to configure the control unit.

Such a computer program may be stored in an application program server that is connected to the image processing device 100 via an arbitrary network and all or a part thereof may also be downloaded as needed.

The program according to the present disclosure may be stored in a computer-readable recording medium or may also be configured as a program product. Such a "recording medium" includes an arbitrary "portable physical medium" such as a memory card, a universal serial bus (USB) memory, a Secure Digital (SD) card, a flexible disk, a magneto-optical disk, a ROM, an erasable programmable read-only memory (EPROM), an electrically erasable programmable read-only memory (EEPROM), a compact disc read-only memory (CD-ROM), a magneto-optic disc (MO), a Digital Versatile Disc (DVD), and Blu-ray (Registered Trademark) Disc.

The "program" is a data processing method that is described in an arbitrary language or description method regardless of a format such as a source code or a binary code. The "program" is not necessarily limited to a singly configured one and also includes one dispersedly configured as a plurality of modules or libraries or one achieving its function in cooperation with a separate program represented by an OS. A well-known configuration or step may be used for a specific configuration for reading a recording medium, reading steps, installation steps after reading, or the like in each unit as illustrated in the embodiment.

Various databases or the like stored in the storage unit 106 are a memory device such as a RAM or a ROM, a fixed disk device such as a hard disk, a flexible disk, and/or a storage means such as an optical disc, and may store various programs, tables, databases, files for a web page, and/or the like that are used for various processes or web site provision.

The image processing device 100 may be configured as an information processing device such as an already-known personal computer or may be configured by connecting an arbitrary peripheral device to the information processing device. The image processing device 100 may be realized by implementing, in the information processing device, software (that includes a program, data, and the like) for realizing the method according to the present disclosure.

A specific configuration of distribution or integration of units is not limited to those illustrated in the drawings, and all or a part thereof can be functionally or physically separated or integrated in arbitrary unit to be configured depending on various additions or the like or depending on a functional load. That is, the above-mentioned embodiments are arbitrarily combined to be implemented or the embodiments may be selectively implemented.

According to one aspect of the present disclosure, it is possible to detect an image of an object accurately even in a background with a color identical or similar to a color of the object.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
    a memory configured to store layout data of a layout of a format; and
    a processor coupled to the memory and configured to execute a crop process, wherein
    the processor is configured to execute:
        first acquiring a captured image that includes a format region;
        detecting edges that are included in the captured image;
        second acquiring edge straight lines based on the edges;
        calculating a correction amount of the format region with reference to the layout based on the edges;
        selecting, as a selected straight line, an edge straight line that is outermost among the edge straight lines that form a rectangle;
        third acquiring a reference straight line that forms an outline of the format region based on the correction amount and the selected straight line;
        specifying a format coordinate of the format region based on the reference straight line;
        executing the crop process on the format region in the captured image based on the format coordinate to acquire format image data; and
        storing the format image data in the memory.

2. The image processing device according to claim 1, wherein the calculating includes calculating the correction amount of the format region with reference to the layout based on a ratio of lengths of the edges.

3. The image processing device according to claim 1, wherein the format region is a region before projective transformation.

4. The image processing device according to claim 1, wherein
    the processor is configured to further execute detecting a read rectangle that is a rectangle that is formed from the edge straight lines, and
    the second acquiring includes acquiring, as a parallel straight line, the edge straight line that is parallel to a side of the read rectangle.

5. The image processing device according to claim 4, wherein
    the selecting includes selecting, as the selected straight line, the parallel straight line that is outermost and satisfies a threshold that is based on the layout and the read rectangle, and
    the third acquiring includes acquiring the reference straight line that is present on an outer side of the selected straight line in accordance with the correction amount when an inner side straight line that is another edge straight line is present on an inner side of the selected straight line in the captured image and a distance between the selected straight line and the inner side straight line is based on the correction amount.

6. The image processing device according to claim 4, wherein
    the selecting includes selecting, as the selected straight line, the parallel straight line that is outermost and satisfies a threshold that is based on the layout and the read rectangle, and
    the third acquiring includes acquiring the reference straight line that is present on an outer side of the selected straight line in accordance with the correction amount when an opposite side inner side straight line that is another edge straight line is present on an inner side of the selected straight line that is an opposite side of the selected straight line in the captured image and a distance between the selected straight line that is the opposite side and the opposite side inner side straight line is based on the correction amount, when an inner side straight line that is another edge straight line is absent on an inner side of the selected straight line in the captured image or when the inner side straight line is present but a distance between the selected straight line and the inner side straight line is not based on the correction amount.

7. The image processing device according to claim 1, wherein
    the specifying includes specifying the format coordinate by calculating a coordinate of a point of intersection between the reference straight lines.

8. The image processing device according to claim 1, wherein
    the second acquiring includes acquiring the edge straight lines by calculating straight line candidates through Hough transformation on the edges and correcting the straight line candidates based on a least-square method.

9. An image processing method comprising:
    by a processor configured to execute a crop process,
        storing layout data of a layout of a format in a memory;
        first acquiring a captured image that includes a format region;
        detecting edges that are included in the captured image;
        second acquiring edge straight lines based on the edges;
        calculating a correction amount of the format region with reference to the layout of the format based on the edges and layout data of the layout;
        selecting, as a selected straight line, an edge straight line that is outermost among the edge straight lines that form a rectangle;
        third acquiring a reference straight line that forms an outline of the format region based on the correction amount and the selected straight line;
        specifying a format coordinate of the format region based on the reference straight line;
        executing the crop process on the format region in the captured image based on the format coordinate to acquire format image data; and
        storing the format image data in the memory.

10. The image processing method according to claim 9, wherein
    the calculating includes calculating the correction amount of the format region with reference to the layout based on a ratio of lengths of the edges.

11. The image processing method according to claim 9, wherein
    the format region is a region before projective transformation.

12. The image processing method according to claim 9, further comprising detecting a read rectangle that is a rectangle that is formed from the edge straight lines, wherein the second acquiring includes acquiring, as a parallel straight line, the edge straight line that is parallel to a side of the read rectangle.

13. The image processing method according to claim 12, wherein the selecting includes selecting, as the selected straight line, the parallel straight line that is outermost and satisfies a threshold that is based on the layout and the read rectangle, and the third acquiring includes acquiring reference straight line that is present on an outer side of the selected straight line in accordance with the correction amount when an inner side straight line that is another edge straight line is present on an inner side of the selected straight line in the captured image and a distance between the selected straight line and the inner side straight line is based on the correction amount.

14. The image processing method according to claim 12, wherein the selecting includes selecting, as the selected straight line, the parallel straight line that is outermost and satisfies a threshold that is based on the layout and the read rectangle, and the third acquiring includes acquiring the reference straight line that is present on an outer side of the selected straight line in accordance with the correction amount when an opposite side inner side straight line that is another edge straight line is present on an inner side of the selected straight line that is an opposite side of the selected straight line in the captured image and a distance between the selected straight line that is the opposite side and the opposite side inner side straight line is based on the correction amount, when an inner side straight line that is another edge straight line is absent on an inner side of the selected straight line in the captured image or when the inner side straight line is present but a distance between the selected straight line and the inner side straight line is not based on the correction amount.

15. The image processing method according to claim 9, wherein the specifying includes specifying the format coordinate by calculating a coordinate of a point of intersection between the reference straight lines.

16. The image processing method according to claim 9, wherein the second acquiring includes acquiring the edge straight lines by calculating straight line candidates through Hough transformation on the edges and correcting the straight line candidates based on a least-square method.

17. A computer program product having a non-transitory tangible computer readable medium including programmed instructions for causing, when executed by a processor included in a computer, the processor to perform execute a crop process, the crop process comprising:

storing layout data of a layout of a format in a memory;

acquiring a captured image that includes a format region;

detecting edges that are included in the captured image;

acquiring edge straight lines based on the edges;

calculating a correction amount of the format region with reference to the layout of the format based on the edges and layout data of the layout;

selecting, as a selected straight line, an edge straight line that is outermost among the edge straight lines that form a rectangle;

acquiring a reference straight line that forms an outline of the format region based on the correction amount and the selected straight line;

specifying a format coordinate of the format region based on the reference straight line;

executing the crop process on the format region in the captured image based on the format coordinate to acquire format image data; and storing the format image data in the memory.

* * * * *